United States Patent [19]

DePietro et al.

[11] Patent Number: 5,404,567
[45] Date of Patent: Apr. 4, 1995

[54] METHOD OF DISTRIBUTING AUDIO PROGRAMMING TO PASSENGER ENTERTAINMENT SYSTEMS, AND APPARATUS

[75] Inventors: Mark G. DePietro, Brea; Craig M. Javid; Edward E. Jubenville, both of Chino Hills, all of Calif.

[73] Assignee: Creative Engineering Unlimited, Inc., Pasadena, Calif.

[21] Appl. No.: 93,325

[22] Filed: Jul. 16, 1993

[51] Int. Cl.$^6$ .............................................. H04H 1/00
[52] U.S. Cl. ................................... 455/6.3; 455/13.1
[58] Field of Search ........................ 381/77, 79, 31, 80, 381/81, 82, 86; 370/50, 73; 364/6, 7, 10, 11, 13, 24, 29, 30, 83, 84, 85, 400, 410, 478, 479; 348/6, 7, 8; 455/3.1, 3.2, 4.1, 4.2, 6.3, 7, 12.1, 11.1, 13.1, 18, 31.1, 32.1, 33.1, 53.1, 54.1, 66; 340/825.25; H04N 7/10

[56] References Cited

U.S. PATENT DOCUMENTS

| | | |
|---|---|---|
| 3,729,581 | 4/1973 | Anderson . |
| 4,138,726 | 2/1979 | Girault et al. . |
| 4,150,801 | 12/1978 | Pygoff ................................. 455/3.2 |
| 4,190,819 | 2/1980 | Burgyan . |
| 4,196,474 | 4/1980 | Buchanan et al. . |
| 4,232,295 | 11/1980 | McConnell . |
| 4,291,373 | 9/1981 | Mizote et al. . |
| 4,295,154 | 10/1981 | Hata et al. . |
| 4,499,568 | 2/1985 | Gremillet ............................ 369/6 X |
| 4,510,499 | 4/1985 | Chisholm et al. . |
| 4,521,857 | 6/1985 | Reynolds, III ....................... 379/101 |
| 4,538,176 | 8/1985 | Nakajima et al. . |
| 4,584,603 | 4/1986 | Harrison . |
| 4,706,198 | 11/1987 | Thurmon ............................. 364/439 |
| 4,812,845 | 3/1989 | Yamada et al. . |
| 4,837,786 | 6/1989 | Gurantz et al. . |
| 4,866,515 | 4/1989 | Tagawa et al. . |
| 4,949,187 | 8/1990 | Cohen . |
| 5,101,357 | 3/1992 | Tempelhof . |
| 5,146,219 | 9/1992 | Zechnall . |
| 5,289,184 | 2/1994 | Suzuki . |

FOREIGN PATENT DOCUMENTS

| | | |
|---|---|---|
| 0170128 | 7/1989 | Japan .................................. 455/54.1 |
| 0020082 | 12/1991 | WIPO .................................. 369/30 |

OTHER PUBLICATIONS

Corporate Computer Systems, Inc., "CDQ2000 Musicam TM Multi-Rate Digital Audio Codec", 1992, pp. 1-5.

Primary Examiner—James J. Groody
Assistant Examiner—David E. Harvey
Attorney, Agent, or Firm—David Weiss

[57] ABSTRACT

A method and apparatus for automating the distribution of audio programming to passenger entertainment systems on-board carriers such as aircraft. Audio signals containing the audio programming are encoded to produce compressed digital audio data signals, and the compressed digital data from the encoded signals are stored and subsequently distributed from a central distribution facility to a plurality of local distribution facilities located at or in the vicinity of airports. The compressed digital data is stored at each of the local distribution facilities, and is subsequently distributed to passenger entertainment systems on-board aircraft locally situated with respect to respective ones to the local distribution facilities. The aircraft received data is stored onto computer storage media, such as computer hard-disks, resident in the passenger entertainment systems on-board the aircraft.

15 Claims, 2 Drawing Sheets

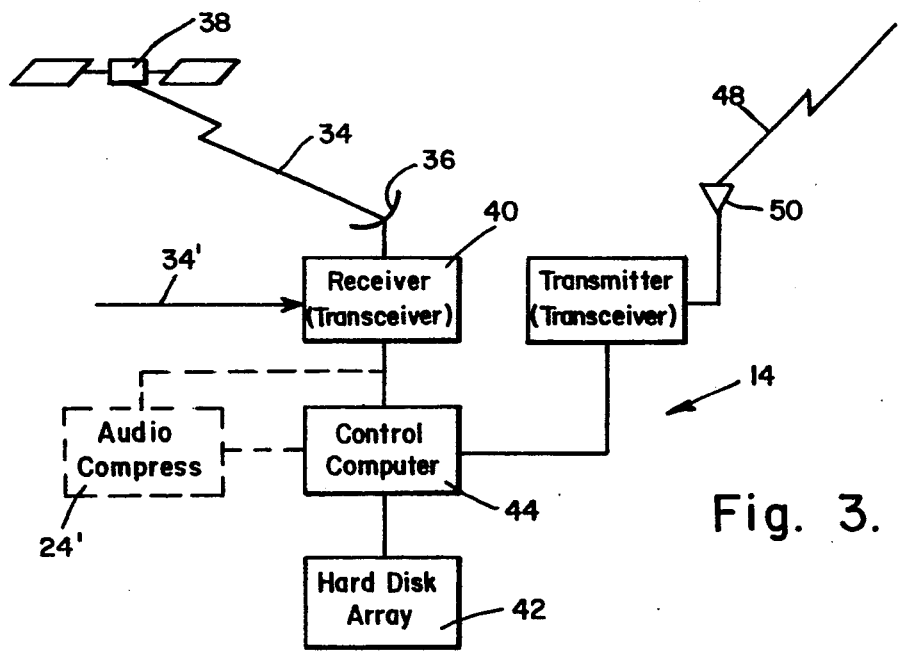
Fig. 3.
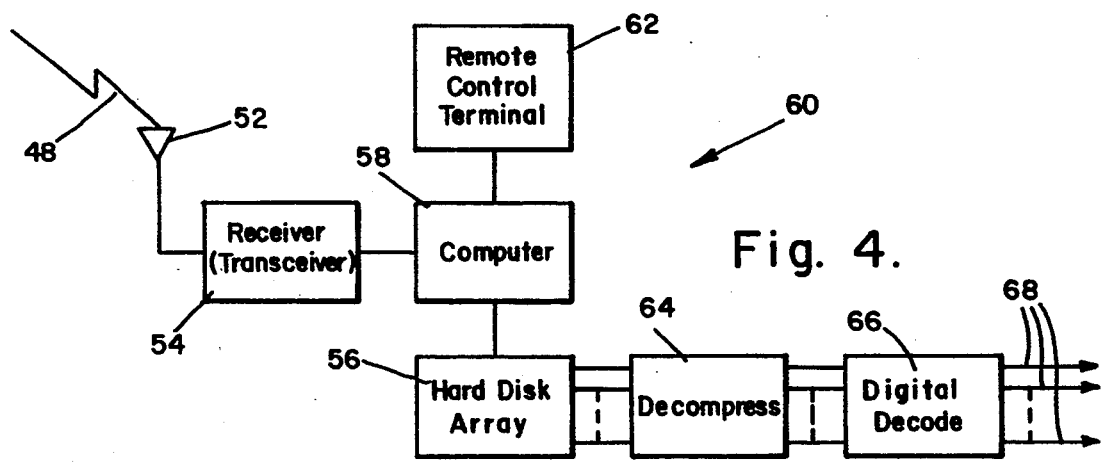
Fig. 4.
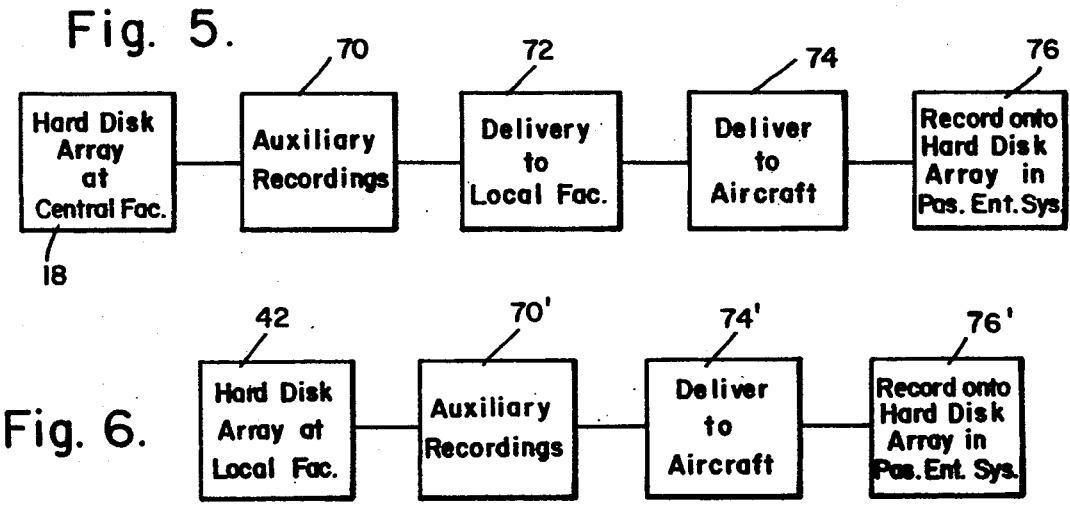

METHOD OF DISTRIBUTING AUDIO PROGRAMMING TO PASSENGER ENTERTAINMENT SYSTEMS, AND APPARATUS

BACKGROUND OF THE INVENTION

This invention relates to a method of and apparatus for distributing audio programming to passenger entertainment systems, and more particularly for distributing audio programming to passenger entertainment systems on-board aircraft.

Passenger carriers, such as aircraft, trains and buses, are often equipped with systems for providing entertainment for passengers. One popular type of passenger entertainment system provides audio programming, generally in the form of a plurality of audio programs including music and speech, on a plurality of channels which may be selected by individual passengers for their listening entertainment and information.

The commercial airline industry, in particular, has made extensive use of passenger entertainment systems, and audio passenger entertainment systems have become common-place aboard commercial passenger aircraft. Such on-board passenger entertainment systems typically include audio playback apparatus for reproducing the audio programs embedded in optical compact disks (CDs) and/or in magnetic audio tapes. Currently, such CDs and tapes are periodically delivered (typically once per month) to an aircraft, for utilization by the aircraft's playback apparatus until replaced when the following month's CD and tape programming is distributed to the aircraft.

Experience has demonstrated that conventional passenger audio entertainment systems using removable program recording media are susceptible to loss of program material due to theft and damage. At the same time, the various audio tapes and/or CDs must be physically delivered to and removed from each aircraft, and the several audio tapes and CDs must be manipulated during their installation in and removal from the playback apparatus aboard each aircraft.

SUMMARY OF THE INVENTION

The present invention provides a method and system for automating the distribution of audio programming to passenger entertainment systems. Rather than delivering tapes and CDs to an aircraft for playback on its passenger entertainment system, the invention provides for the on-board recording or loading of the audio data onto computer storage media resident in the aircraft's passenger entertainment system, and in particular onto a hard-disk array, and the audio programs on the the hard-disk array are played back by the passenger entertainment system. Programming may be periodically replaced by erasing the then-resident data from the hard-disks while recording the new audio data onto the hard-disks. Security of the audio program material is significantly enhanced by the distribution system of the present invention, since the audio data is stored on physically inaccessible computer hard-disk. Unlike the prior art systems, the present system does not require the on-board manipulation of several audio tapes or CDs since the computer hard-disk is not removed from the passenger entertainment system.

Briefly described, the method of distributing audio programming to passenger entertainment systems, according to the present invention, comprises the steps of: providing audio data signals including the audio programming; encoding the signals to produce compressed digitally coded audio data signals; storing the compressed digitally coded data from the encoded signals; distributing the stored data from a central distribution facility to a plurality of local distribution facilities; distributing the centrally distributed data from the local distribution facilities to passenger entertainment systems locally situated with respect to respective ones of the local distribution facilities; and storing the locally distributed data onto computer storage media, such as computer hard-disk, in the locally situated passenger entertainment systems.

The audio data signal providing step, the encoding step, and the step of storing the compressed digitally coded data may be implemented at a mastering facility, which may be the central distribution facility from which the stored data is distributed to the plurality of local distribution facilities. The step of distributing the stored data from the central distribution facility may be implemented by telecommunications link to the plurality of local distribution facilities, for example by telephone link or by satellite link. The step of distributing the centrally distributed data from the local distribution facilities to the various passenger entertainment systems may be implemented by radio-frequency communications link.

Alternatively, the step of distributing the stored data from the central distribution facility to the plurality of local distribution facilities may include the steps of producing auxiliary recordings of the stored data and delivering such recordings to the local distribution facilities. The step of distributing the centrally distributed data from the local distribution facilities to the passenger entertainment systems may include the steps of producing auxiliary recordings of the centrally distributed data at the local distribution facilities and delivering such recordings to the locally situated passenger entertainment systems, or by delivering to the locally situated passenger entertainment systems the auxiliary recordings previously delivered to the local distribution facilities from the central distribution facility. In either case, the step of storing the locally distributed data onto computer storage media resident in the locally situated passenger entertainment systems includes the step of recording or loading the data from the delivered auxiliary recordings onto the passenger entertainment system computer storage media.

In some situations, particularly in connection with satellite broadcast communication between the central distribution facility and the various local distribution facilities, it may be advantageous to transmit the digitally coded audio data in its uncompressed form. In such event, either the compressed digital signal may be decompressed prior to transmission or the encoding step at the central distributing facility may omit the compression function, and the compression function would be performed at the local distribution facilities.

In the context of passenger entertainment systems located aboard aircraft, the local distribution facilities are preferably located at or in the vicinity of airports.

The system, according to one aspect of the present invention, for distributing audio programs to passenger entertainment systems on-board a plurality of aircraft, comprises in combination: means for encoding audio data signals including a plurality of audio programs to produce compressed digitally coded audio data signals; means including first computer storage media, preferably computer hard-disk, for storing the compressed digitally coded data from the encoded signals onto the first computer storage media; central facility transmitting means for transmitting the stored data from a central facility to a plurality of local facilities preferably located at or in the vicinity of airports; local facilities receiving means for receiving the transmitted data at the plurality of local facilities; local facilities storage means including second computer storage media, preferably hard-disk, for storing the received data at the respective local facilities onto the second computer storage media; local facilities transmitting means for transmitting the locally stored data from the respective local facilities for being received by aircraft locally situated with respect to respective ones of the local facilities transmitting means; aircraft receiving means for receiving the locally transmitted data by the locally situated aircraft; and aircraft storage means including third computer storage media, preferably hard-disk, resident in the passenger entertainment systems on-board the aircraft for storing the aircraft received data onto the third computer storage media. The on-board passenger entertainment systems include decompression means for decompressing the data stored by the third computer storage media, as well as decoding means, for generating analog audio output signals therefrom.

BRIEF DESCRIPTION OF THE DRAWINGS

The novel features which are believed to be characteristic of the invention, together with further advantages thereof, will be better understood from the following description considered in connection with the accompanying drawings in which preferred embodiments of the method of and system for practicing the invention are illustrated by way of example. It is to be expressly understood, however, that the drawings are for the purpose of illustration and description only and not intended as a definition of the limits of the invention.

FIG. 3 is a block diagram of a preferred embodiment of a local distribution facility represented in FIG. 1;

FIG. 4 is a block diagram representing passenger entertainment system equipment on-board each of the aircraft represented in FIG. 1;

FIG. 5 is a block diagram representing first alternative method steps for distributing audio program material to an aircraft's passenger entertainment system according to the present invention; and FIG. 6 is a block diagram representing second alternative method steps for distributing audio program material to an aircraft's passenger entertainment system according to the present invention.

DESCRIPTION OF THE PREFERRED EMBODIMENTS

Figure 1:
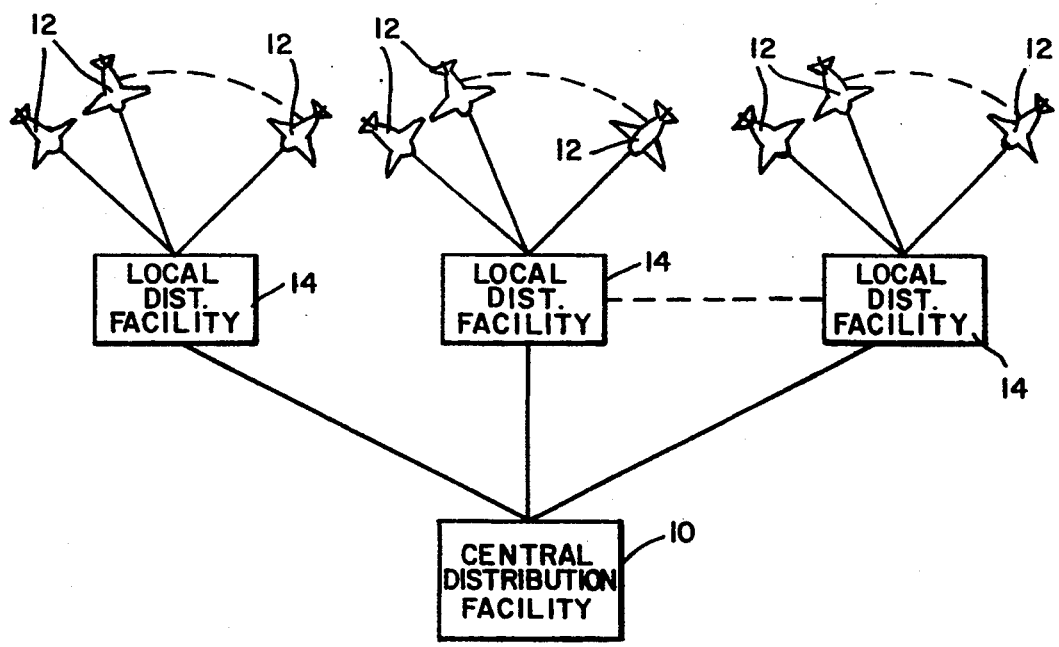
FIG. 1 is a block diagram representing an overview of a system for distributing audio programming to aircraft according to the method of the present invention.

The system overview of FIG. 1, which is to be considered in connection with the discussion of FIGS. 2 through 6, is representative of the method and system according to the present invention for distributing audio programming from a central distribution facility 10 to aircraft 12 situated at various locations throughout the world, without leaving tangible media in the aircraft from which the audio programs are to be played back in passenger entertainment systems on-board the aircraft 12. In the preferred system embodiment, the audio programming is distributed from the central distribution facility 10 to a plurality of geographically disbursed local distribution facilities 14. Each local distribution facility 14 subsequently distributes the audio program data to aircraft 12 locally situated with respect to a particular local distribution facility 14, where such data is stored onto computer storage media resident in each of the aircraft 12, as hereinafter described.

Figure 2:
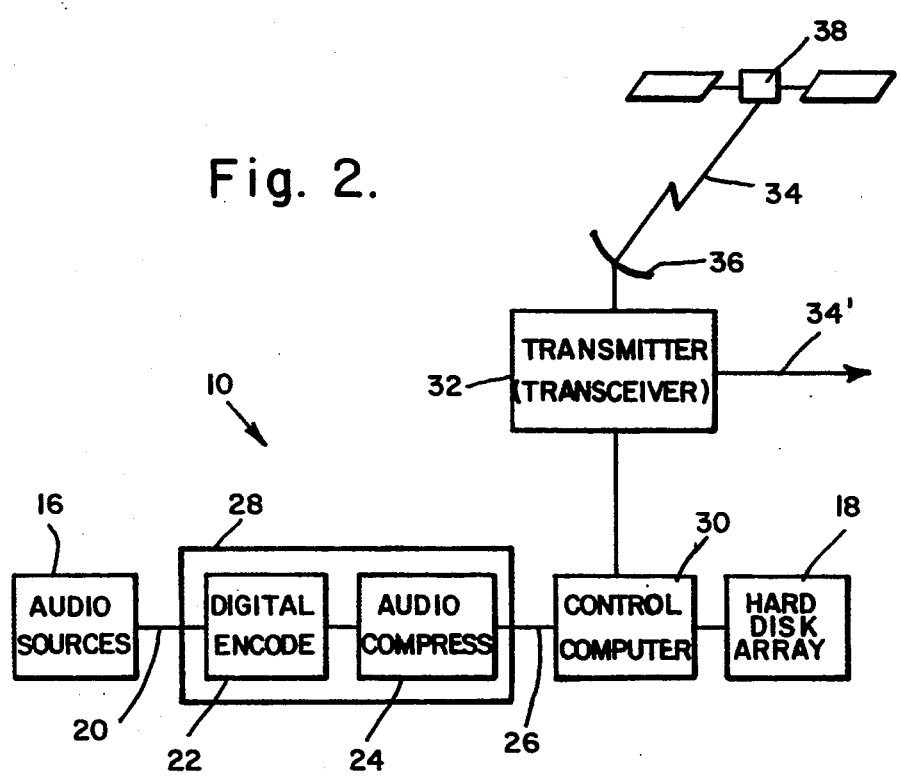
FIG. 2 is a block diagram of a preferred embodiment of the central distribution facility represented in FIG. 1.

A preferred embodiment of a central distribution facility 10 is represented in block form in FIG. 2. The audio program material is derived from various audio sources 16, such as prerecorded music and speech performances from which multi-channel compressed digital audio master recordings may be created and stored on computer hard-disks of a conventional hard-disk array 18.

When producing the preferred master hard-disk recordings, the audio analog data signals 20 from the audio sources 16 are digitized by digital encoder means 22, and the digitally coded audio data signals are compressed by audio compression means 24, to produce compressed digitally coded audio data signals 26.

Compression of the digital audio signals is preferably implemented utilizing the International Standards Organization (ISO) standard Motion Picture Experts Group (MPEG) compression algorithm, Layer II/IIA, widely known under the trademark MUSICAM. MPEG MUSICAM compression utilizes source coding techniques in the digital reduction of high quality audio signals by reducing redundancy and irrelevance in the audio signal. A suitable MUSICAM encoder 28, combining the digital encoding and the audio compression functions 22, 24, is manufactured by CCS Audio Products Division of Corporate Computer Systems, Inc. (Holmdel, N.J.), specifically its Model CDQ 2000 MUSICAM multi-rate digital audio codec. A brochure titled "CDQ 2000 MUSICAM ™ Multi-rate Digital Audio CODEC", published by Corporate Computer Systems, Inc. in 1992 (5 pages), further describes this apparatus as well as MPEG audio digital compression technology, and is incorporated herein by reference. The multi-rate capability of such devices permits adjustment of the data rate for providing suitability for high-fidelity music audio and speech audio, the music audio requiring higher bit rates than the speech audio. At a data rate of 128 kbits per second, or at a 10 to 1 digital compression, only the world's most discriminating audiophiles may be capable of differentiating between MPEG MUSICAM compressed audio and uncompressed audio.

The compressed digital audio data contained in the signals 26 are stored onto computer hard-disks of the hard disk array 18 through a control computer 30 operating as a mastering workstation in conjunction with the MUSICAM encoder 28. Each hard-disk of the array 18 may have stored thereon a different stereo music program (such as may be produced from existing audio program sources such as prerecorded tapes and compact disks), the several programs on the hard-disk array 18 representing a plurality of channels which (when resident in a hard-disk array on-board an aircraft) may be accessed by an aircraft passenger. In addition, the control computer 30 may permit creation of a custom channel containing discrete message segments with additional data for supporting a random access capability for subsequent use by the aircraft flight crew to play back boarding music and selected announcements to the aircraft passengers. In any event, the control computer 30 is utilized for creating a plurality of master recordings on the hard-disks of the array 18, for example one channel of compressed digital audio programming per hard-disk may be stored in the master hard-disk array 18. The hard-disk array 18 may include, for example, four, eight or more hard-disks.

Typically, new program material is distributed to the aircraft 12 on a periodic basis, such as once each month. The method envisions new or updated compressed digital audio program data to be periodically stored on the master hard-disk array 18, and the updated data is transmitted to the local distribution facilities 14 (FIG. 1) from the central distribution facility 10 by transmitter means 32. For example, a satellite communications link 34 may be utilized with the transmitter 32 operating as an earth station with uplink antenna 36 transmitting microwave signals containing the compressed digital audio data from the hard-disk array 18 to communications satellite 38. The satellite received signals are retransmitted to complete the communications link 34 with each of the local distribution facilities 14, either concurrently or sequentially, such retransmitted signals being received by downlink antenna 38 and receiver 40, as shown in FIG. 3.

Other telecommunication systems may alternatively be utilized for transmitting the compressed digital data from the central distribution facility 10 to the local distribution facilities 14, such as telephone link 34'. A Bulletin Board System (BBS) with multiple high speed links may be employed. If transmission from the central distribution facility 10 to the several local distribution facilities 14 were to occur sequentially, each receiving local facility 14 may acknowledge receipt to the central distribution facility 10. For this purpose the transmitter means 32 and the receiver means 40 may be replaced by transceiver means as indicated in FIGS. 2 and 3.

In certain situations it may be impractical to acknowledge safe receipt of the data by a local facility 14 to the central facility 10, in particular in connection with a satellite communications link where the earth station is transmitting in broadcast mode and all local facilities are simultaneously listening. One means for decreasing the likelihood that a reception error will not result in the generation of any audible flaws during subsequent play-back of the audio programs, is to assure redundancy in the transmitted signal. To this effect, it may be advantageous to transmit the digitally coded audio data in its uncompressed form. At the central facility 10, the compressed digital audio data may be decompressed prior to transmission or the encoding step may omit the compression function, and the decompression step instead would be performed at the local distribution facilities 14 by subjecting the received uncompressed digital data to the audio compression means 24'.

At each local distribution center 14, the compressed digital audio data is stored onto computer hard-disks of a conventional hard-disk array 42 through a control computer 44. The program material stored on the hard-disk arrays 42 at the local distribution facilities 14 would normally be in the same channel per disk configuration as on the master hard disk-array 18. If desired, however, the control computer 44 may be employed for reprogramming or editing the programs in accordance with specific needs of particular aircraft to which the audio programming is to be transmitted.

Each local distribution facility is preferably located at or in the vicinity of a major airport facility at which aircraft periodically land for maintenance and/or other services. When it is time to update the audio programming in the passenger entertainment system of a particular aircraft while it is at such an airport, the compressed digital audio data from the local distribution facility hard-disk array 42 is transmitted through the control computer 44 by transmitter means 46 to that aircraft 12. Transmission is preferably accomplished by radio-frequency communications link 48 from the local facility radio antenna 50 (FIG. 3) to the radio antenna 52 of receiving means 54 on-board the aircraft (FIG. 4). The data from each channel may be transmitted either sequentially or simultaneously. Receipt of the data may be acknowledged by each aircraft, and for this purpose the local facility transmitter 46 and the aircraft receiver 54 may be replaced by transceivers as noted in FIGS. 3 and 4.

The compressed digitally coded audio data received by the receiver 54 aboard an aircraft 12 is stored onto hard-disks of a hard-disk array 56 of computer 58 of the passenger entertainment system 60 on-board the aircraft. The program material stored on the aircraft's hard disk-array 56 is in the same channel per disk configuration as on the hard-disk array 42 at the local facility 14 from which the audio data is received. Playback of the program material on each hard-disk or channel is controlled by the computer 58 and the remote control terminal 62 of the on-board passenger entertainment system 60.

During playback, the compressed digitally coded audio data from each of the hard-disks of the hard-disk array 56 is decompressed by decompression means 64 using standard MPEG MUSICAM decompression techniques, and is digitally decoded by digital decoder means 66, to produce analog audio output signals containing the passenger entertainment programs. For example, during playback the data signals from the several hard-disks of the hard-disk array 56 may be separately decompressed and digitally decoded by means of respective MUSICAM decoders such as Model CDQ 2000E MUSICAM multi-rate digital audio decoders manufactured by CCS Audio Products Division of Corporate Computer Systems, Inc.

FIGS. 5 and 6 represent alternative method steps for distributing the audio program data to the hard-disk array 56 in the passenger entertainment systems 60 aboard the aircraft 12. As indicated in FIG. 5, the compressed digital data on the hard-disk array 18 at the central facility 10 is utilized for producing auxiliary recordings 70, such as streaming tapes. The auxiliary recordings 70 are delivered to the local facilities 14 (as indicated by box 72), and an auxiliary recording 70 or streaming tape is subsequently delivered from a local facility 14 to a locally situated aircraft 12 (box 74) where the audio information on the auxiliary recording is recorded or loaded onto the hard-disks of the hard-disk array 56 in the passenger entertainment system 60 on-board the aircraft 12 (box 76). After the compressed digital data is transferred onto the aircraft's hard-disk array 56, the auxiliary recording 70 is preferably removed from the aircraft. It may be noted that the data resident in the auxiliary recording 70 is not directly playable on a conventional tape player, since the data is in MUSICAM compressed digital audio data-stream format, a condition which operates to reduce the risk of loss by theft of the auxiliary recordings 70.

Alternatively, as shown in FIG. 6, the hard-disk array 42 at a local facility 14 may be utilized to produce one or more auxiliary recordings 70', such as a streaming tape, containing the compressed digitally coded audio program data. Such an auxiliary recording 70' is delivered to an aircraft 12 (indicated by box 74') where the data thereon is recorded or loaded onto the hard-disks of the hard-disk array 56 in the passenger entertainment system 60 on-board the aircraft 12 (box 76'), afterwhich the auxiliary recording 70' is preferably removed from the aircraft.

Thus there has been described a method of and apparatus for distributing audio programming to passenger entertainment systems on-board passenger carriers and aircraft in particular. Since the data is stored on computer hard-disk in the aircraft's passenger entertainment system, loss of program material due to theft is unlikely. The inconvenience of manipulating tapes or CDs is avoided, as well as program loss due to storage media damage as is common with tapes and compact disks through handling. High speed electronic data transfer may be utilized to distribute program material from a mastering facility to local airport facilities, and high speed radio-frequency links may be used at the airports to distribute the program data from the local airport facility to the individual aircraft, so that periodic updates of program material may be supplied to the aircraft in an automated fashion.

Modifications in the method of the present invention and variations in the preferred and alternative manner of practicing the invention herein presented, as well as other embodiments of the apparatus shown for practicing the method of the present invention, may be developed without departing from the essential characteristics thereof. Accordingly, the invention should be limited only by the scope of the claims listed below.

We claim:

1. A method of distributing audio programs to passenger entertainment systems on-board a plurality of aircraft, comprising the steps of:
   providing audio data including a plurality of audio programs;
   encoding said data to produce compressed digitally coded audio data;
   storing said compressed digitally coded data onto a hard-disk array;
   transmitting the stored compressed digitally coded data from a central facility for being received by a plurality of local facilities;
   receiving the transmitted data by said local facilities;
   storing the received data at said local facilities onto hard-disk arrays;
   transmitting the locally stored data from said local facilities for being received by passenger entertainment systems on-board aircraft locally situated with respect to respective ones of said local facilities;
   receiving the locally transmitted data by said passenger entertainment systems on-board said locally situated aircraft; and
   storing the aircraft received data onto hard-disk arrays resident in said passenger entertainment systems.

2. Apparatus for distributing audio programs to passenger entertainment systems on-board a plurality of aircraft, comprising in combination:
   means for encoding audio data including a plurality of audio programs to produce compressed digitally coded audio data;
   means including first computer storage media for storing said compressed digitally coded data onto said first computer storage media;
   central facility transmitting means for transmitting the stored compressed digitally coded data from a central facility to a plurality of local facilities;
   local facilities receiving means for receiving the transmitted data at the plurality of local facilities;
   local facilities storage means including second computer storage media for storing the received data at the respective local facilities onto said second computer storage media;
   local facilities transmitting means for transmitting the locally stored data from the respective local facilities for being received by aircraft locally situated with respect to respective one of said local facilities transmitting means;
   aircraft receiving means for receiving the locally transmitted data by the locally situated aircraft; and
   aircraft storage means including third computer storage media resident in the passenger entertainment systems for storing the aircraft received data onto said third computer storage media.

3. The apparatus according to claim 2, wherein:
   said third computer storage media include a hard-disk array resident in each of the aircraft passenger entertainment systems.

4. The apparatus according to claim 3, wherein said first computer storage media include a hard-disk array.

5. The apparatus according to claim 3, wherein:
   said second computer storage media include a hard-disk array at each of the local facilities.

6. A method of distributing audio programming to a plurality of passenger carriers, comprising the steps of:
   providing audio data including the audio programming;
   encoding said data to produce compressed digitally coded audio data;
   storing said compressed digitally coded data at a central facility;
   transmitting the stored data from said central facility for being received by a plurality of local facilities;
   receiving the transmitted data by said local facilities;
   storing the received data at said local facilities;
   distributing the locally stored data from said local facilities to passenger carriers locally situated with respect to respective ones of said local facilities; and
   storing the locally distributed data onto computer controlled storage media in said locally situated carriers.

7. The method according to claim 6, wherein:
   the step of distributing said locally stored data from said local facilities to said locally situated carriers includes the steps of producing auxiliary recordings of said locally stored data and delivering said recordings to said locally situated carriers.

8. The method according to claim 7, further including the step of:
   providing a passenger entertainment system on board each carrier of said plurality of carriers, each said passenger entertainment system including said computer controlled storage media.

9. The method according to claim 8, wherein:
   during the passenger entertainment system providing step, said computer controlled storage media in each said passenger entertainment system includes a hard-disk array; and during the step of storing said locally distributed data, said locally distributed data are stored onto said hard-disk array.

10. The method according to claim 6, wherein the step of distributing said locally stored data includes the steps of:

transmitting said locally stored data from said local facilities for being received by said locally situated carriers; and receiving the locally transmitted data by said carriers.

11. The method according to claim 10, further including the steps of:

providing a passenger entertainment system on-board each carrier of said plurality of carriers, each said passenger entertainment system including said computer controlled storage media; and decoding the data stored on said storage media and generating analog audio output signals therefrom.

12. The method according to claim 11, wherein:

during the passenger entertainment system providing step, said computer controlled storage media in each said passenger entertainment system includes a hard-disk array; and during the step of storing the carrier received data, said carrier received data are stored onto said hard-disk array.

13. The method according to claim 6, wherein:

the steps of transmitting the data from said central facility and receiving the data by said local facilities are implemented by telecommunications linking means.

14. The method according to claim 6, wherein:

the steps of transmitting the data from said central facility and receiving the data by said local facilities are implemented by satellite communications linking means.

15. The method according to claim 10, wherein:

the steps of transmitting the data from said local facilities and receiving the data by said carriers are implemented by radio-frequency communications linking means.

* * * * *